US012695908B2

(12) United States Patent
Tian et al.

(10) Patent No.: US 12,695,908 B2
(45) Date of Patent: Jul. 28, 2026

(54) ADAPTIVE LINEAR LIFTING TRANSFORM

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 8 days.

(21) Appl. No.: 18/777,254

(22) Filed: Jul. 18, 2024

(65) Prior Publication Data

US 2025/0030889 A1 Jan. 23, 2025

Related U.S. Application Data

(60) Provisional application No. 63/527,721, filed on Jul. 19, 2023.

(51) Int. Cl.
*H04N 19/597* (2014.01)
*H04N 19/17* (2014.01)

(52) U.S. Cl.
CPC ........... *H04N 19/597* (2014.11); *H04N 19/17* (2014.11)

(58) Field of Classification Search
CPC .............................. H04N 19/597; H04N 19/17
See application file for complete search history.

(56) References Cited

U.S. PATENT DOCUMENTS

| | | | |
|---|---|---|---|
| 2006/0290695 A1* | 12/2006 | Salomie | G06T 17/20 |
| | | | 345/423 |
| 2018/0041768 A1* | 2/2018 | Koo | H04N 19/119 |
| 2019/0139266 A1* | 5/2019 | Budagavi | G06T 17/20 |
| 2023/0074762 A1 | 3/2023 | Huang et al. | |

FOREIGN PATENT DOCUMENTS

WO WO-2025002021 A1 * 1/2025 ............. H04N 19/52

OTHER PUBLICATIONS

"Information technology—Coded representation of immersive media—Part 29: Video-based dynamic mesh coding (V-DMC)", WD stage, ISO/IEC JTC 1/SC 29/WG 7, ISO 23090-29:2023(E), 2023, 74 pages.
Daubechies et al., "Factoring wavelet transforms into lifting steps", Research Gate, 1998, 27 pages.
Mammou et al., "[V-CG] Apple's Dynamic Mesh Coding CfP Response", Apple Inc., International Organisation for Standardisation Organisation Internationale De Normalisation, ISO/IEC JTC 1/SC 29/WG 7 m59281, Coding of Moving Pictures and Audio, Apr. 2022, 24 pages.
International Search Report and Written Opinion received in PCT/US2024/038834 mailed Oct. 17, 2024, 8 pages.

* cited by examiner

*Primary Examiner* — Tat C Chio
(74) *Attorney, Agent, or Firm* — ARENTFOX SCHIFF LLP

(57) ABSTRACT

In a method of mesh decoding, a bitstream that includes prediction information of a plurality of vertices in a mesh frame is received. A prediction value of a current vertex of the plurality of vertices is determined based on (i) a value of the current vertex received in the bitstream and (ii) each distance between the current vertex and one or more neighboring vertices of the current vertex in the mesh frame. The current vertex is reconstructed based on the prediction value of the current vertex.

20 Claims, 10 Drawing Sheets

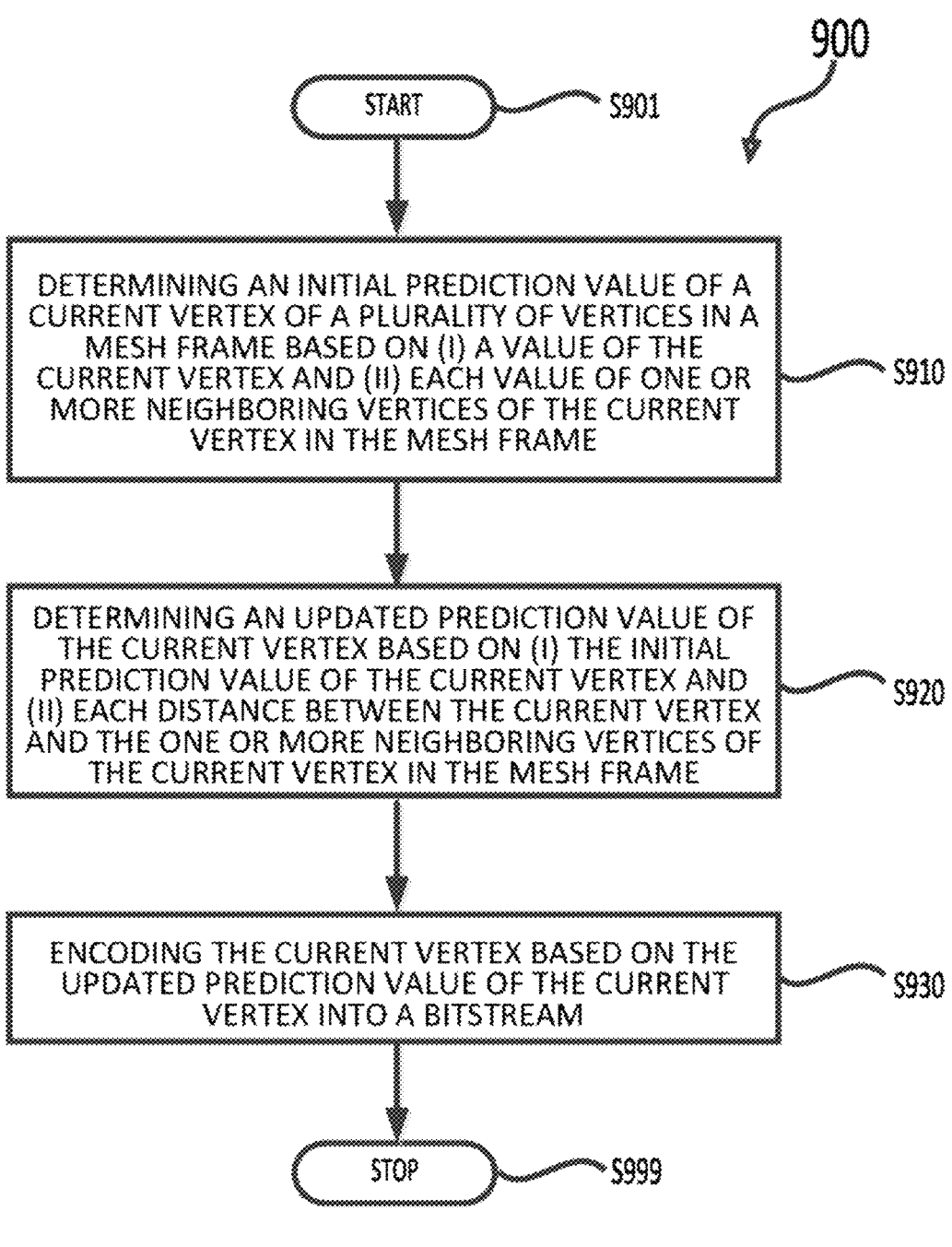

900

START — S901

DETERMINING AN INITIAL PREDICTION VALUE OF A CURRENT VERTEX OF A PLURALITY OF VERTICES IN A MESH FRAME BASED ON (I) A VALUE OF THE CURRENT VERTEX AND (II) EACH VALUE OF ONE OR MORE NEIGHBORING VERTICES OF THE CURRENT VERTEX IN THE MESH FRAME — S910

DETERMINING AN UPDATED PREDICTION VALUE OF THE CURRENT VERTEX BASED ON (I) THE INITIAL PREDICTION VALUE OF THE CURRENT VERTEX AND (II) EACH DISTANCE BETWEEN THE CURRENT VERTEX AND THE ONE OR MORE NEIGHBORING VERTICES OF THE CURRENT VERTEX IN THE MESH FRAME — S920

ENCODING THE CURRENT VERTEX BASED ON THE UPDATED PREDICTION VALUE OF THE CURRENT VERTEX INTO A BITSTREAM — S930

STOP — S999

FIG. 9

ADAPTIVE LINEAR LIFTING TRANSFORM

INCORPORATION BY REFERENCE

The present application claims the benefit of priority to U.S. Provisional Application No. 63/527,721, "Adaptive Linear Lifting Transform" filed on Jul. 19, 2023, which is incorporated by reference herein in its entirety.

TECHNICAL FIELD

The present disclosure describes aspects generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

Advances in three-dimensional (3D) capture, modeling, and rendering have promoted 3D content across various platforms and devices. For example, a baby's first step in one continent is captured and grandparents may see (and in some cases interact) and enjoy a full immersive experience with the child in another continent. In order to achieve such realism, models are becoming more sophisticated, and a significant amount of data is linked to the creation and consumption of those models. 3D meshes are widely used to represent such immersive contents.

SUMMARY

Aspects of the disclosure include bitstreams, methods, and apparatuses for mesh processing. In some examples, an apparatus for mesh processing includes processing circuitry.

According to an aspect of the disclosure, a method of mesh decoding is provided. In the method, a bitstream that includes prediction information of a plurality of vertices in a mesh frame is received. A prediction value of a current vertex of the plurality of vertices is determined based on (i) a value of the current vertex received in the bitstream and (ii) each distance between the current vertex and one or more neighboring vertices of the current vertex in the mesh frame. The current vertex is reconstructed based on the prediction value of the current vertex.

In an aspect, the one or more neighboring vertices of the current vertex include a plurality of neighboring vertices. An updated value of the current vertex is determined. The prediction value of the current vertex is determined as a sum of (i) the updated value of the current vertex and (ii) an average value of the plurality of neighboring vertices.

In an aspect, a ratio for each of the plurality of neighboring vertices is determined. The ratio is equal to a value of the respective neighboring vertex over a distance between the current vertex and the respective neighboring vertex. A sum of the ratios of the plurality of neighboring vertices is determined. A product of (i) a constant and (ii) the sum of the ratios of the plurality of neighboring vertices is determined. The update value of the current vertex is determined as the value of the current vertex minus the product of (i) the constant and (ii) the sum of the ratios of the plurality of neighboring vertices.

In an aspect, the constant is equal to a scalar constant over a total number of the plurality of neighboring vertices.

In an aspect, the mesh frame is a selected mesh frame in a mesh sequence.

In an aspect, the plurality of vertices is included in a selected region of the mesh frame.

In an aspect, the plurality of vertices is included in a base layer of the mesh frame.

In an aspect, the plurality of vertices is included in an enhancement layer of the mesh frame.

In an aspect, the plurality of vertices is included in a selected frequency band of the mesh frame.

According to another aspect of the disclosure, a method of mesh encoding is provided. In the method, an initial prediction value of a current vertex of a plurality of vertices in a mesh frame is determined based on (i) a value of the current vertex and (ii) each value of one or more neighboring vertices of the current vertex in the mesh frame. An updated prediction value of the current vertex is determined based on (i) the initial prediction value of the current vertex and (ii) each distance between the current vertex and the one or more neighboring vertices of the current vertex in the mesh frame. The current vertex is encoded based on the updated prediction value of the current vertex into a bitstream.

In an aspect, the one or more neighboring vertices of the current vertex include a plurality of neighboring vertices. The initial prediction value of the current vertex is determined as (i) the value of the current vertex minus (ii) an average value of the plurality of neighboring vertices.

In an aspect, a ratio for each of the plurality of neighboring vertices is determined. The ratio is equal to a value of the respective neighboring vertex over a distance between the current vertex and the respective neighboring vertex. A sum of the ratios of the plurality of neighboring vertices is determined. A product of (i) a constant and (ii) the sum of the ratios of the plurality of neighboring vertices is determined. The update prediction value of the current vertex is determined as a sum of the initial prediction value of the current vertex and the product of (i) the constant and (ii) the sum of the ratios of the plurality of neighboring vertices.

According to yet another aspect of the disclosure, a method of processing mesh data is provided. In the method, a bitstream of the mesh data is processed according to a format rule. The bitstream includes prediction information of a plurality of vertices in a mesh frame. The format rule specifies that a prediction value of a current vertex of the plurality of vertices is determined based on (i) a value of the current vertex received in the bitstream and (ii) each distance between the current vertex and one or more neighboring vertices of the current vertex in the mesh frame. The format rule specifies that the current vertex is processed based on the prediction value of the current vertex.

Aspects of the disclosure also provide an apparatus for mesh encoding. The apparatus for mesh encoding including processing circuitry configured to implement any of the described methods for mesh encoding.

Aspects of the disclosure also provide an apparatus for mesh decoding. The apparatus for mesh decoding including processing circuitry configured to implement any of the described methods for mesh decoding.

Aspects of the disclosure also provide a non-transitory computer-readable medium storing instructions which, when executed by a computer, cause the computer to perform any of the described methods for mesh decoding, encoding, and mesh data processing.

BRIEF DESCRIPTION OF THE DRAWINGS

Further features, the nature, and various advantages of the disclosed subject matter will be more apparent from the following detailed description and the accompanying drawings in which:

FIG. 9 shows a flow chart outlining a mesh encoding process according to some aspects of the disclosure.

DETAILED DESCRIPTION

Figure 1:
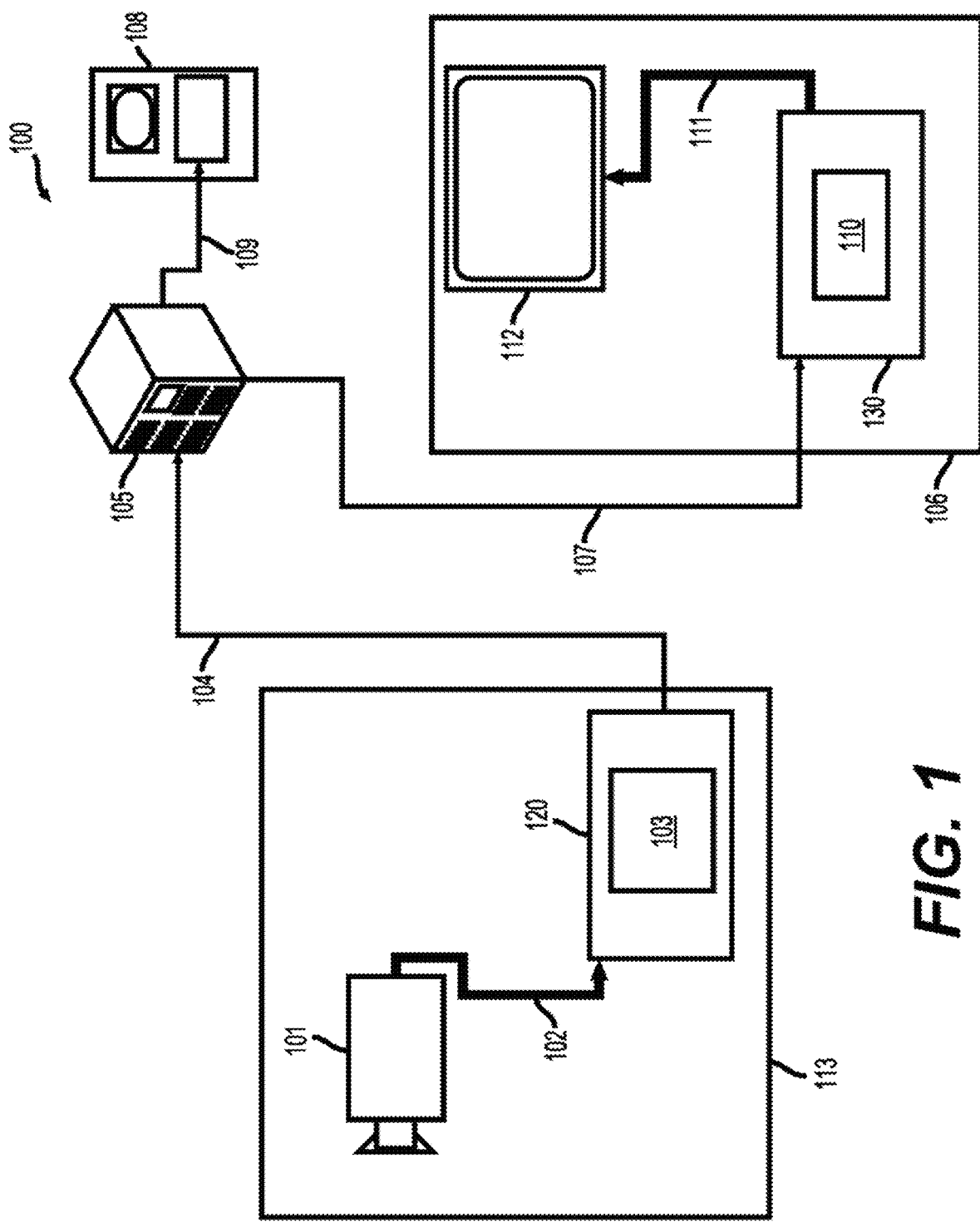
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101). The video source (101) may include one or more images captured by a camera and/or generated by a computer. For example, a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
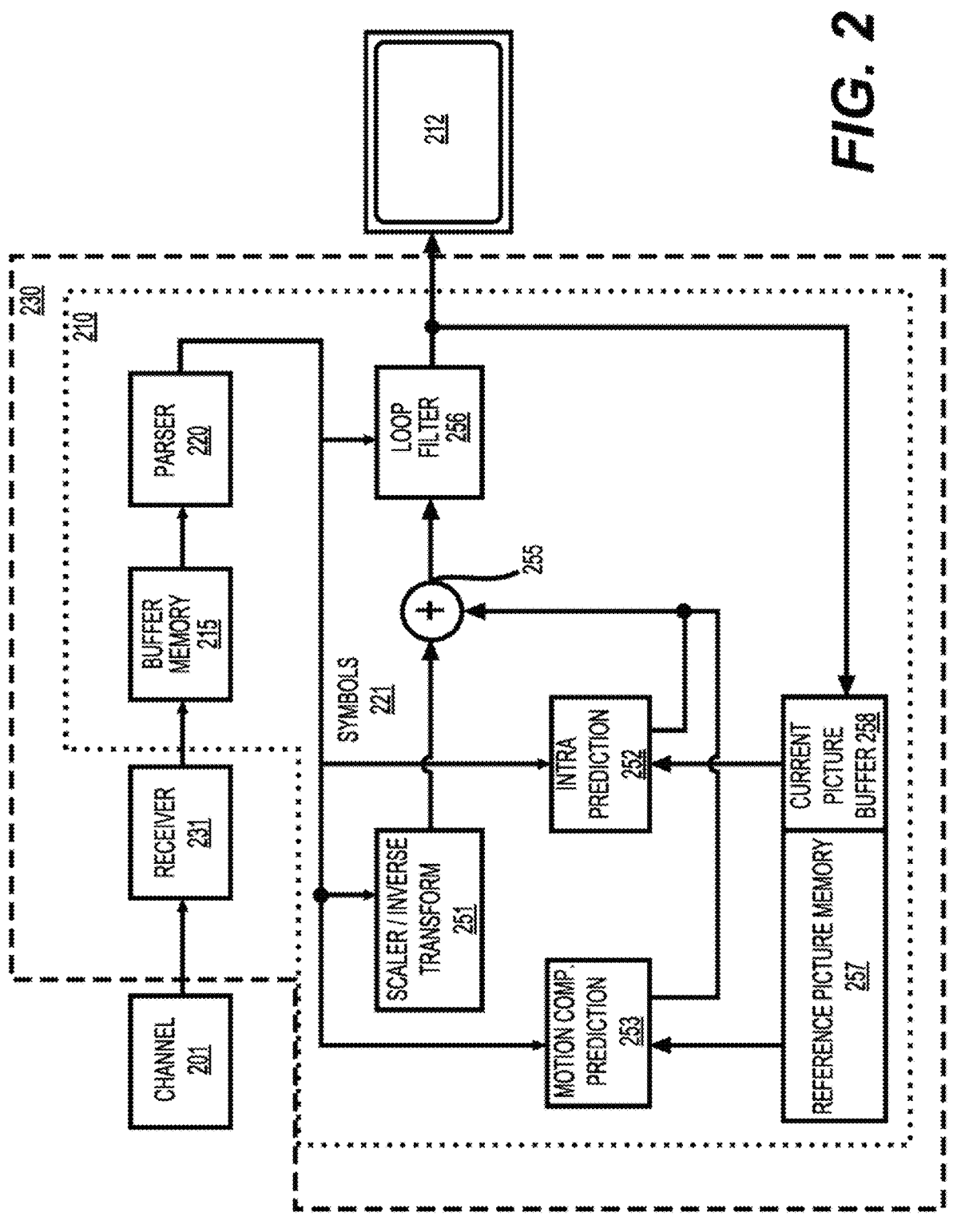
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/ parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
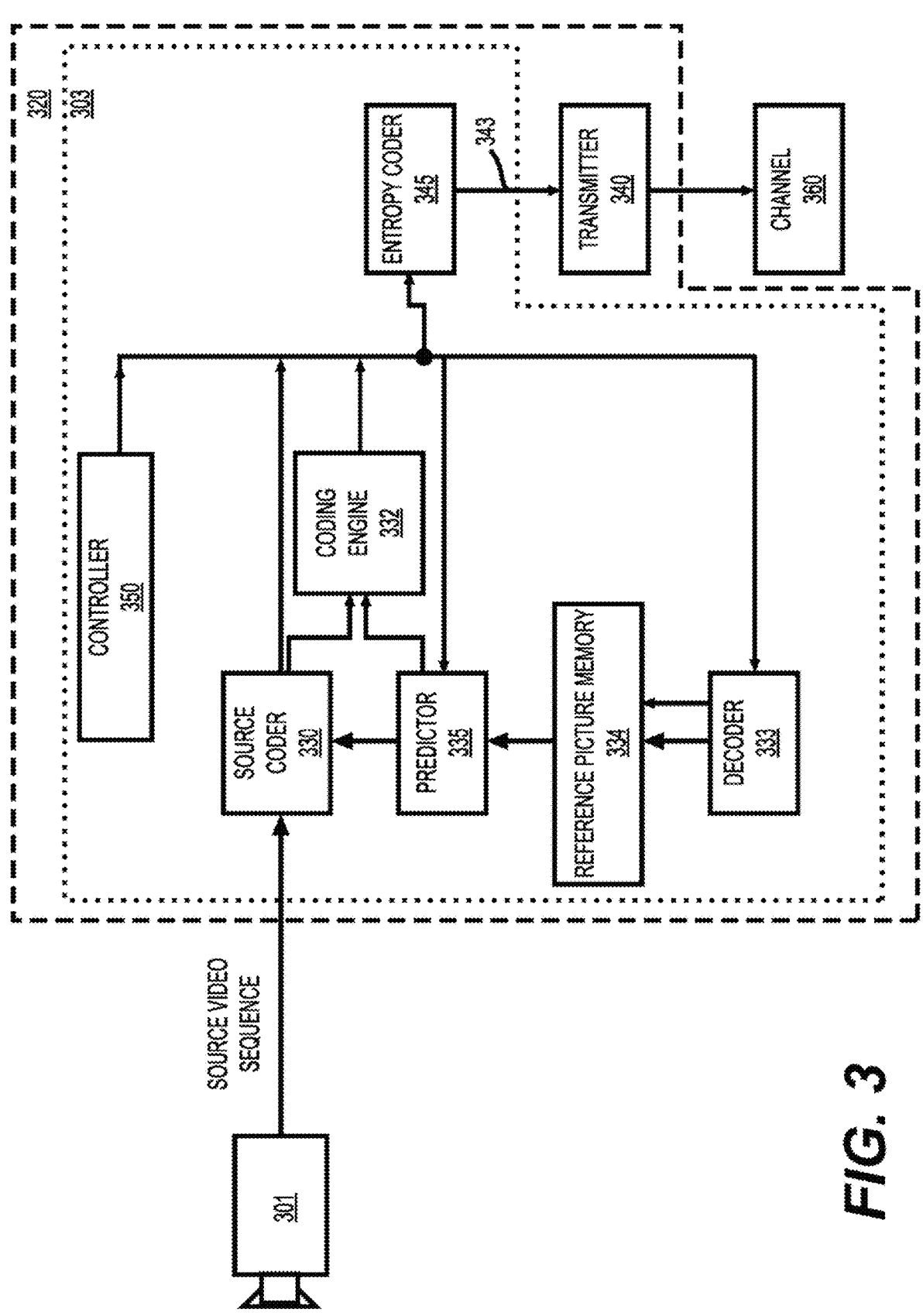
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture (or a mesh) to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

In an example, a mesh position quantization step size is defined based on a first parameter, such as mesh_position_quantization_step_size_log 2_denominator, and a second parameter, such as mesh_position_quantization_step_size_numerator_minus1. In an example, mesh_position_quantization_step_size_log 2_denominator is the log 2 of the denominator of the position quantization step size, with a value between 0 and 7, inclusively. In an example, mesh_position_quantization_step_size_numerator_minus1 plus 1 is the value of the numerator of the position quantization step size, with a value between 1 and 256, inclusively. After the position coding in MEB, the reconstructed position values used for reference are scaled to the dynamic range of the inter frames.

An example of a mesh attributes encoding parameters syntax is as follows:

```
mesh_attribute_encoding_parameters( index ) {
Descriptor
    mesh_attribute_bit_depth_minus1[ index ]
u(4)
    if ( index == 0 ) { // Attribute type: Texture coordinate
        mesh_attribute_quantization_step_size_log2_denominator[
        index ]
u(3)
        mesh_attribute_quantization_step_size_numerator[ index ]
u(8)
    }
    mesh_attribute_per_face_flag[ index ]
u(1)
    if( !mesh_attribute_per_face_flag[ index ] ) {
        mesh_attribute_separate_index_flag[ index ]
u(1)
        if( !mesh_attribute_separate_index_flag[ index ] )
            mesh_attribute_reference_index_plus1[ index ]
ue(v)
    }
    mesh_attribute_prediction_method[ index ]
ue(v)
    mesh_attribute_residuals_encoding_method[ index ]
ue(v)
}
```

An example of mesh attributes encoding parameters semantics is defined by a parameter, such as mesh_attribute_quantization_step_size_log 2_denominator[i]. In an example, mesh_attribute_quantization_step_size_log 2_denominator[i] is the log 2 of the denominator of the i-th attribute quantization step size, with a value between 0 and 7, inclusively.

An example of general base mesh sequence parameter set RBSP syntax is as follows:

```
bmesh_sequence_parameter_set_rbsp( ) {
Descriptor
    bmsps_sequence_parameter_set_id
```

-continued

```
u(4)
    bmesh_profile_tier_level( )
    bmsps_intra_mesh_codec_id
u(8)
    bmsps_inter_mesh_codec_id
u(8)
    bmsps_inter_mesh_motion_group_size_minus1
u(8)
    bmsps_inter_mesh_max_num_neighbors_minus1
u(8)
    bmsps_geometry_3d_bit_depth_minus1
u(5)
    bmsps_inter_quantization_step_size_log2_denominator
u(3)
    bmsps_inter_quantization_step_size_numerator_minus1
u(8)
    bmsps_facegroup_segmentation_method
ue(v)
    bmsps_mesh_attribute_count
u(7)
    for( i = 0; i < bmsps_mesh_attribute_count; i++ ) {
        bmsps_mesh_attribute_type_id[ i ]
u(4)
        bmsps_attribute_bit_depth_minus1[ i ]
u(5)
        bmsps_attribute_msb_align_flag[ i ]
u(1)
    }
    bmsps_log2_max_mesh_frame_order_cnt_lsb_minus4
ue(v)
    bmsps_max_dec_mesh_frame_buffering_minus1
ue(v)
    bmsps_long_term_ref_mesh_frames_flag
u(1)
    bmsps_num_ref_mesh_frame_lists_in_bmsps
ue(v)
    for( i = 0; i < bmsps_num_ref_mesh_frame_lists_in_bmsps; i++ )
        bmesh_ref_list_struct( i )
    bmsps_extension_present_flag
u(1)
    if( bmsps_extension_present_flag ) {
        bmsps_extension_count_minus1
u(7)
    }
    if( bmsps_extension_present_flag ){
        bmsps_extensions_length_minus1
ue(v)
        while( more_rbsp_data( ) )
            bmsps_extension_data_byte
u(1)
    }
    rbsp_trailing_bits( )
}
```

An example of motion field quantization is defined by a first parameter, such as bmsps_inter_quantization_step_size_log 2_denominator, and a second parameter, such as bmsps_inter_quantization_step_size_numerator_minus1. In an example, bmsps_inter_quantization_step_size_log 2_denominator is the log 2 of the denominator of the motion field quantization step size, with a value between 0 and 7, inclusively. In an example, bmsps_inter_quantization_step_size_numerator_minus1 plus 1 is the value of the numerator of the motion field quantization step size, with a value between 1 and 256, inclusively. After motion field coding, the position values are reconstructed and would be used as references for future vertices. In an example, a mesh attribute quantization is defined by a step size parameter, such as mesh_attribute_quantization_step_size_numerator[i].

In an example, mesh_attribute_quantization_step_size_numerator[i] is the value of the numerator of the i-th attribute quantization step size, with a value between 0 and 255, inclusively. Meanwhile, the quantized prediction residue is de-quantized. A reconstructed value is calculated by adding the de-quantized prediction residue to the prediction value. The reconstructed value can be used as a reference for future vertices.

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure include methods and systems directed to adaptive linear transform, such as an adaptive linear lifting transform.

A mesh may include several polygons that describe a surface of a volumetric object. Each polygon of the mesh may be defined by vertices of the corresponding polygon in a three-dimensional (3D) space and information of how the vertices are connected, which may be referred to as connectivity information. In some aspects, vertex attributes, such as colors, normals, and the like, may be associated with the vertices (or the mesh vertices). Attributes (or vertex attributes) may also be associated with the surface of the mesh by exploiting mapping information that parameterizes the mesh with two-dimensional (2D) attribute maps. Such mapping may be described by a set of parametric coordinates, referred to as UV coordinates or texture coordinates, associated with the mesh vertices. 2D attribute maps may be used to store high resolution attribute information such as texture, normals, displacements, and the like. The high-resolution attribute information may be used for various purposes such as texture mapping and shading.

A dynamic mesh sequence may require a large amount of data since the dynamic mesh may include a significant amount of information changing over time. Therefore, efficient compression technologies may be used to store and transmit such contents. Mesh compression standards, such as Information and Communication (IC) mesh compression, MESHGRID, and frame-based animated mesh compression (FAMC), were previously developed by Moving Picture Experts Group (MPEG) to address dynamic meshes with a constant connectivity, a time varying geometry, and vertex attributes. However, the standards may not consider time varying attribute maps and connectivity information. DCC (Digital Content Creation) tools may generate such dynamic meshes. However, it may be challenging for volumetric acquisition techniques to generate a constant connectivity dynamic mesh, especially under real time constraints. This type of content (e.g., a constant connectivity dynamic mesh) may not be supported by existing standards. The present disclosure includes aspects directed to new mesh compression standard that can directly handle dynamic meshes with time varying connectivity information and optionally time varying attribute maps. The mesh compression may target lossy and lossless compression for various applications, such as real-time communications, a storage, a free viewpoint video, Augmented Reality (AR), and Virtual Reality (VR). Functionalities, such as a random access and a scalable/progressive coding, may also be considered.

Mesh geometry information may include vertex connectivity information, 3D coordinates, 2D texture coordinates, and/or the like. The 3D vertex coordinates and the 2D texture coordinates account for a significant portion of the mesh geometry information. Accordingly, compression of the 3D vertex coordinates (also referred to as vertex positions) as well as 2D texture coordinates is needed to reduce the amount of data needed to store and/or transfer the mesh geometry information.

Figure 4:
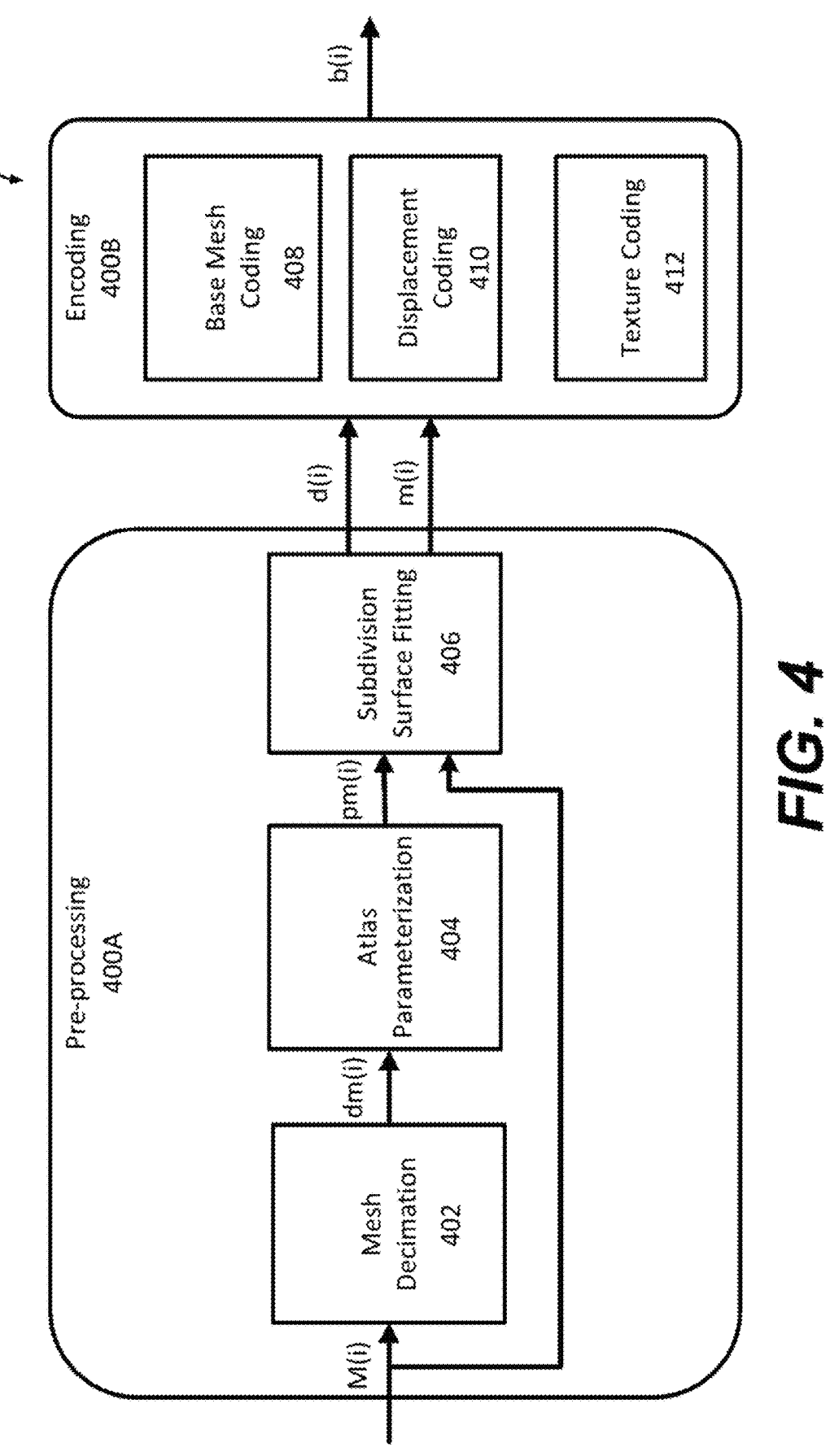
FIG. 4 is a schematic illustration of an example of an encoding process (400) for mesh processing according to an aspect of the disclosure.

FIG. 4 shows an example of an encoding process (400) for mesh processing based on a related video codec, such as MPEG V-Mesh™ v1.0, according to an aspect of the disclosure. As shown in FIG. 4, the encoding process (400) may include a pre-processing step (400A) and an encoding step (400B). The pre-processing step (400A) may be configured to generate a base mesh m(i) of a current frame and a displacement field d(i) of the current frame that includes displacement vectors according to an input mesh M(i) of the current frame. The encoding step (400B) may be configured to encode the base mesh m(i), the displacement field d(i), and texture information of the base mesh m(i). The displacement field d(i) of the current frame may include displacement vectors. An index i may refer to the current frame. In an aspect, a mode decision method may be performed in the encoding process (400) to determine whether inter coding (also referred to as inter frame prediction or an inter mode), intra coding (also referred to as intra frame prediction or an intra mode), or the like is applied to the current frame. For example, the mode decision method may compare a cost of an intra mode and a cost of an inter mode and decide a coding mode of the base mesh m(i) of the current frame based on which one of the costs is smaller. In some examples, a skip mode is used to code (e.g., encode or decode) the base mesh m(i). In an example, the skip mode is a special mode of the inter mode. For example, the base mesh m(i) may be intra coded, or inter coded, or coded with the SKIP mode.

Still referring to FIG. 4, the pre-processing step (400A) may include a mesh decimation process (402), a parameterization process such as an atlas parameterization process (404), and a subdivision surface fitting process (406). The mesh decimation process (402) is configured to downsample vertices of the input mesh M(i) to generate a decimated mesh dm(i) that may include a plurality of decimated (or down-sampled) vertices. A number of the plurality of decimated vertices is less than a number of the vertices of the input mesh M(i). The parameterization process such as the atlas parameterization process (404) is configured to map the decimated mesh dm(i) onto a planar domain, such as onto a UV atlas (or a UV map), to generate a re-parameterized mesh pm(i). In an example, the atlas parameterization may be performed based on a video processing tool, such as a UV Atlas tool. The subdivision surface fitting process (406) is configured to take the re-parameterized mesh pm(i) and the input mesh M(i) as inputs and produce a based mesh m(i) together with the displacement field d(i) that includes the displacement vectors or a set of displacements. In an example of the subdivision surface fitting process (406), pm(i) is subdivided by using a subdivision scheme such as an iterative interpolation to obtain a subdivided mesh. The iterative interpolation includes inserting at each iteration a new point in a middle of each edge of the re-parameterized mesh pm(i). Any suitable subdivision scheme may be applied to subdivide pm(i). The displacement field d(i) is computed by determining a nearest point on a surface of the input mesh M(i) for each vertex of the subdivided mesh.

An advantage of the subdivided mesh may include that the subdivided mesh has a subdivision structure that allows efficient compression, while offering a faithful approximation of the input mesh. An increase in compression efficiency may be obtained due to the following properties. The decimated mesh dm(i) may have a low number of vertices and may be encoded and transmitted using a lower number of bits than the input mesh M(i) or the subdivided mesh. Referring to FIG. 4, the base mesh m(i) may be generated from the decimated mesh dm(i). In an example, the base mesh m(i) is the decimated mesh dm(i). As the subdivided mesh may be generated based on the subdivision method, the subdivided mesh may be automatically generated by the decoder when the base mesh or the decimated mesh is decoded (e.g., there is no need to use any information other than the subdivision scheme and a subdivision iteration count). At the decoder side, the displacement field d(i) may be generated by decoding the displacement vectors associated with the vertices of the subdivided mesh. Besides allowing for spatial/quality scalability, the subdivision structure enables efficient transforms such as wavelet decomposition, which can offer high compression performance.

For the purposes of brevity, the pre-processing step (400A) that may be applied to an input mesh such as a 3D mesh may be illustrated using a pre-processing step (500) that is applied to a two-dimensional (2D) curve. The pre-processing step (400A) and the pre-processing step (500) are similar except that a 3D mesh may be replaced by a 2D curve.

Figure 5:
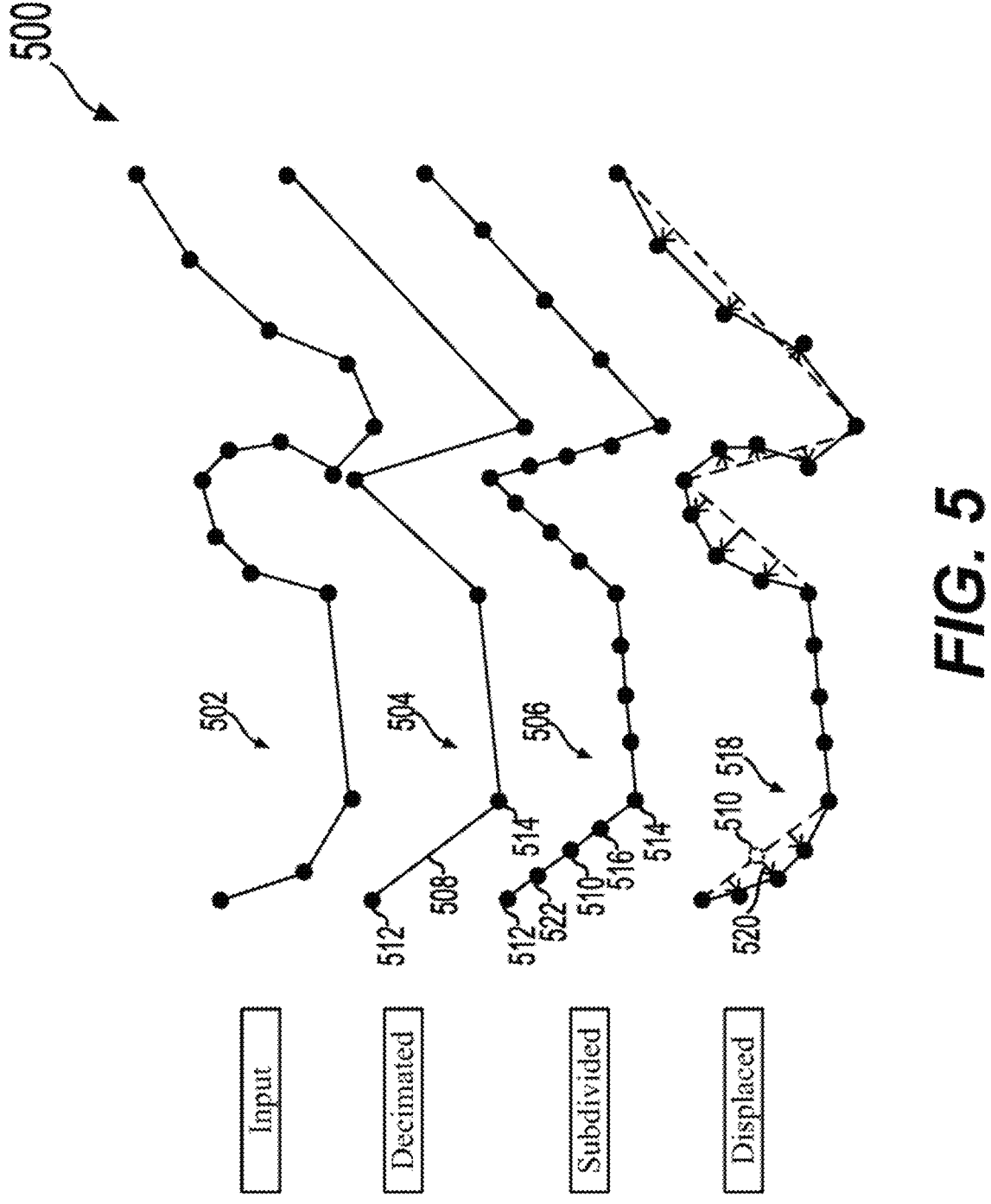
FIG. 5 is a schematic illustration of an example of pre-processing step (500) according to an aspect of the disclosure.

FIG. 5 shows an example of the pre-processing step (500) according to an aspect of the disclosure. As shown in FIG. 5, an input 2D curve (represented by a 2D polyline) (502) may be down-sampled to generate a base curve such as a polyline, referred to as "decimated" curve (504). A subdivision scheme may then be applied to the decimated polyline (504) to generate a "subdivided" curve (506). In an example, the subdivision scheme may be an iterative interpolation scheme. The iterative interpolation scheme may include inserting at each iteration a new point in a middle of each edge of the polyline (or decimated curve) (504). For example, a point (510) may be inserted in the edge (508) of the decimated curve (504). In an example, the edge (508) is between points (512) and (514). Further, a point (522) may be added between the point (512) and the point (510), and a point (516) may be added between the point (510) and the point (514). The subdivided polyline (506) is then deformed to generate a displaced curve (518). The displaced curve (518) may be a better approximation of the input curve (502) than the subdivided curve (506). For example, a displacement vector (e.g., (520)) is computed for each vertex (e.g., (510)) of the subdivided curve (506) such that a shape of the displaced curve (518) is as close as possible to a shape of the input curve (502). An advantage of the subdivided curve (506) is that the subdivided curve (506) has a subdivision structure that allows for more efficient compression, while offering a faithful approximation of the input curve (502).

The decimated curve (504) may have a lower number of points and may be encoded and transmitted using a limited number of bits. As the subdivided curve may be generated based on the subdivision scheme, the subdivided curve may be automatically generated by the decoder when the base curve or the decimated curve is decoded (e.g., there is no need to use any information other than the subdivision method and a subdivision iteration count). The displaced curve is generated by decoding the displacement vectors associated with the subdivided curve vertices. Besides allowing for spatial/quality scalability, the subdivision structure enables efficient transforms such as wavelet decomposition, which can offer high compression performance.

Still referring to FIG. 5, in an example, an input mesh M(i) may include the input 2D curve (502). A base mesh m(i) may include the decimated curve (504) that is formed via down-sampled vertices of the input 2D curve (502). A displacement field dm(i) may include a plurality of displacement vectors, such as the displacement vector (520) shown in FIG. 5.

The encoding step (400B) may include a base mesh coding (408), a displacement coding (410), a texture coding (412), and the like. The base mesh coding (408) is configured to encode geometric information of the base mesh m(i) associated with the current frame. In an intra encoding, the base mesh m(i) may be first quantized (e.g., using uniform quantization) and then encoded, for example, by the coding mode determined using the mode decision method. The coding mode may be the inter mode, the intra mode, the skip mode, or the like. The encoder used to intra code the base mesh m(i) may be referred to as a static mesh encoder. In the inter encoding, a reference base mesh (e.g., a reconstructed quantized reference base mesh m'(j)) associated with a reference frame indicated by an index j may be used to predict the base mesh m(i) associated with the current frame indicated by the index i. The displacement coding (410) is configured to encode the displacement field d(i) that is generated in the pre-processing step (400A). The displacement field d(i) may include a set of displacement vectors (or displacements) associated with the subdivided mesh vertices. The texture coding (412) is configured to encode attribute information of the base mesh m(i). The attribute information may include texture, normal, color, and/or the like. The attribute information may be encoded based on a suitable codec, such as High-Efficiency Video Coding (HEVC) or Versatile Video Coding (VVC).

In an aspect, referring to FIG. 4, a mesh encoding process such as the encoding process (400) starts with a pre-processing (e.g., the pre-processing step (400A)). The pre-processing may convert the input mesh (e.g., the input dynamic mesh) M(i) into the base mesh m(i) together with the displacement field d(i) including a set of displacements (or a set of displacement vectors). The encoding step (400B) may compress outputs (e.g., m(i), d(i), and the like) from the pre-processing and generate a compressed bitstream b(i). The compressed bitstream b(i) may include a compressed base mesh bitstream, a compressed displacement field bitstream, a compressed attribute bitstream, and/or the like.

Figure 6:
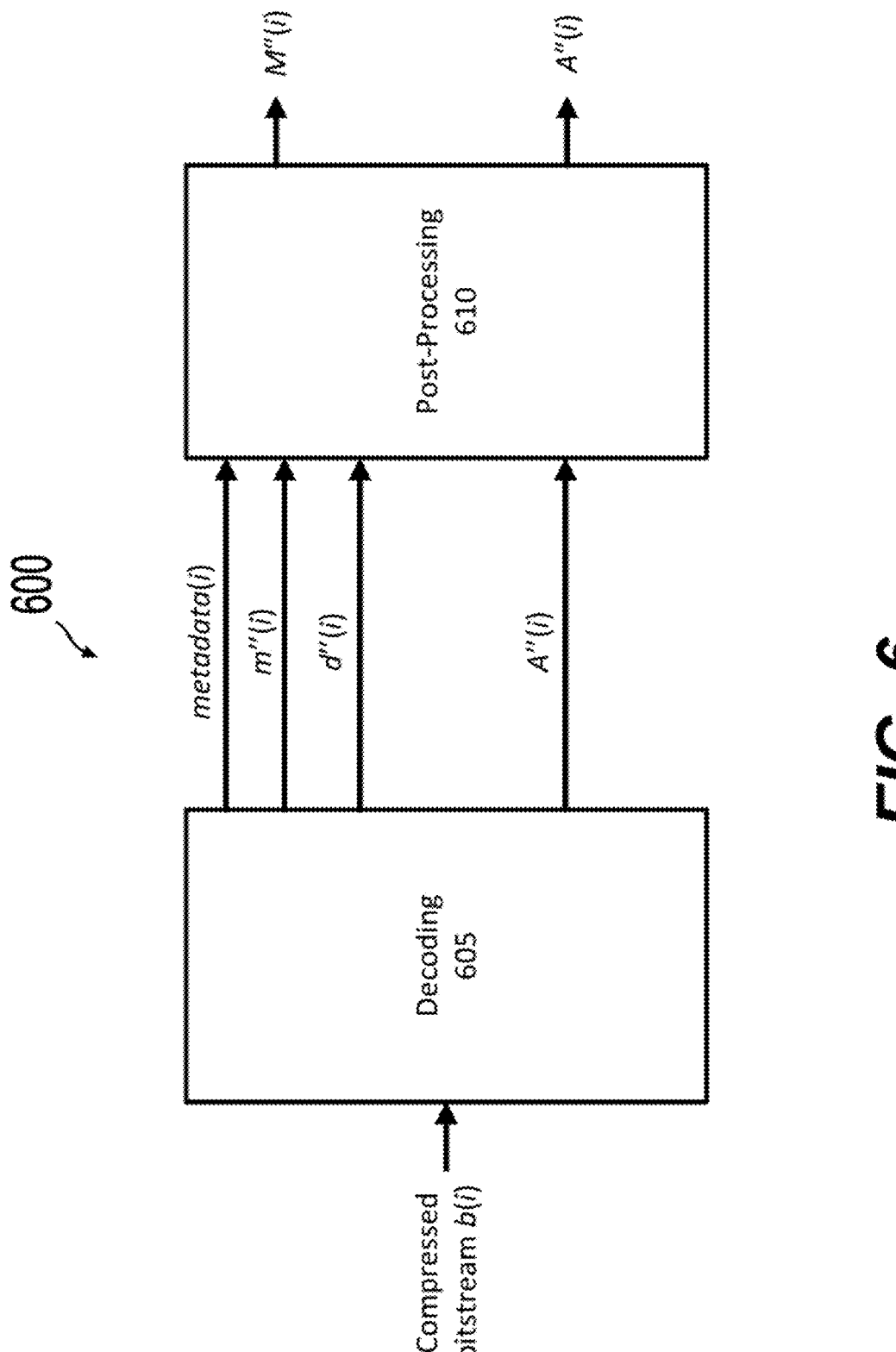
FIG. 6 is a schematic illustration of a decoding process (600) for mesh processing according to an aspect of the disclosure.

FIG. 6 shows an example of a decoding process (600) for mesh processing according to an aspect of the disclosure. The decoding process (600) may include a decoding step (605) and a post-processing step (610). A compressed bitstream b(i) may be fed to the decoding step (605). In an example, such as for a lossless transmission, the compressed bitstream b(i) is the output b(i) from the encoding process (400). The decoding step (605) may extract various sub-bitstreams such as the compressed base mesh sub-stream, the compressed displacement field sub-stream, the compressed attribute sub-stream, and/or the like. The decoding step (605) may decompress the sub-bitstreams to generate the following components: patch metadata indicated by metadata(i), a decoded base mesh m"(i), a decoded displacement field (including displacements) d"(i), a decoded attribute map A"(i), and/or the like.

In an aspect, the base mesh sub-stream may be fed to a mesh decoder to generate a reconstructed quantized base mesh m'(i). The decoded base mesh (or reconstructed base mesh) m"(i) may be obtained by applying an inverse quantization to m'(i). The displacement field sub-stream including packed and quantized wavelet coefficients that are encoded may be decoded by a video and/or image decoder. Image unpacking and inverse quantization may be applied to the packed quantized wavelet coefficients that are reconstructed to obtain the unpacked and unquantized transformed coefficients (e.g., wavelet coefficients). An inverse wavelet transform may be applied to the unpacked and unquantized wavelet coefficients to generate the decoded displacement field (or reconstructed displacement) d"(i).

The decoded components (e.g., including metadata(i), m"(i), d"(i), A"(i), and/or the like) may be fed to a post-processing step (610). A mesh (also referred to as a decoded/reconstructed mesh) M"(i) may be generated by the post-processing step (610) based on m"(i) and d"(i). In an example, the mesh M"(i) (also referred to as a reconstructed deformed mesh DM(i)) may be obtained by subdividing m"(i) using a subdivision scheme and applying the reconstructed displacements d"(i) to vertices of a subdivided mesh. In an example, the DM (i) may include the displaced curve (518). In an example, when the encoding process (400), the decoding process (600), and the transmission are lossless, the mesh M"(i) may be identical to the input mesh M(i). When one of the encoding process (400), the decoding process (600), and the transmission is lossy, M"(i) is different from M(i). In various examples, the difference, if any, between M"(i) and M(i) may be relatively small. In an example, an attribute map A"(i) is also generated by the post-processing step (610).

In an aspect, a base mesh may be intra coded, inter coded, or coded with a SKIP mode, or the like. In an example, the SKIP mode may be a special mode of the inter mode where a base mesh m(i) of a current frame indicated by an index i is the same as a base mesh m( ) of a reference frame indicated by an index (also referred to as a frame index) j. When the inter mode is applied to code the base mesh in the current frame, the encoder may generate a predicted base mesh of the current frame based on the reconstructed base mesh of the reference frame. In an example, such as in MPEG V-DMC WD 2.0, the reference frame is the frame immediately before the current frame in a display order. The frame index i of the current frame indicates the display order. When the frame index of the current frame is i, the frame index of the reference frame is (i−1). In an example, the current frame and the reference frame are in the same group of frames (GoF).

In an aspect, a mesh encoding process, such as in MPEG V-DMC WD 2.0, starts with a pre-processing. The pre-processing may convert an input dynamic mesh, denoted M(i), into a base mesh m(i) together with a set of displacements d(i). An encoder may compress the base mesh m(i) and the displacements d(i) to generate a compressed bitstream b(i).

As shown in FIG. 4, the pre-processing may include mesh decimation, atlas parameterization, and subdivision surface fitting. The mesh decimation may use a simplification technique to decimate the input mesh M(i) and produce a decimated mesh dm(i). The decimated mesh dm(i) may be re-parameterized. The generated mesh may be denoted as pm(i). The subdivision surface fitting may take the re-parameterized mesh pm(i) and the input mesh M(i) as input to produce the base mesh m(i) together with the set of displacements d(i).

Figure 7:
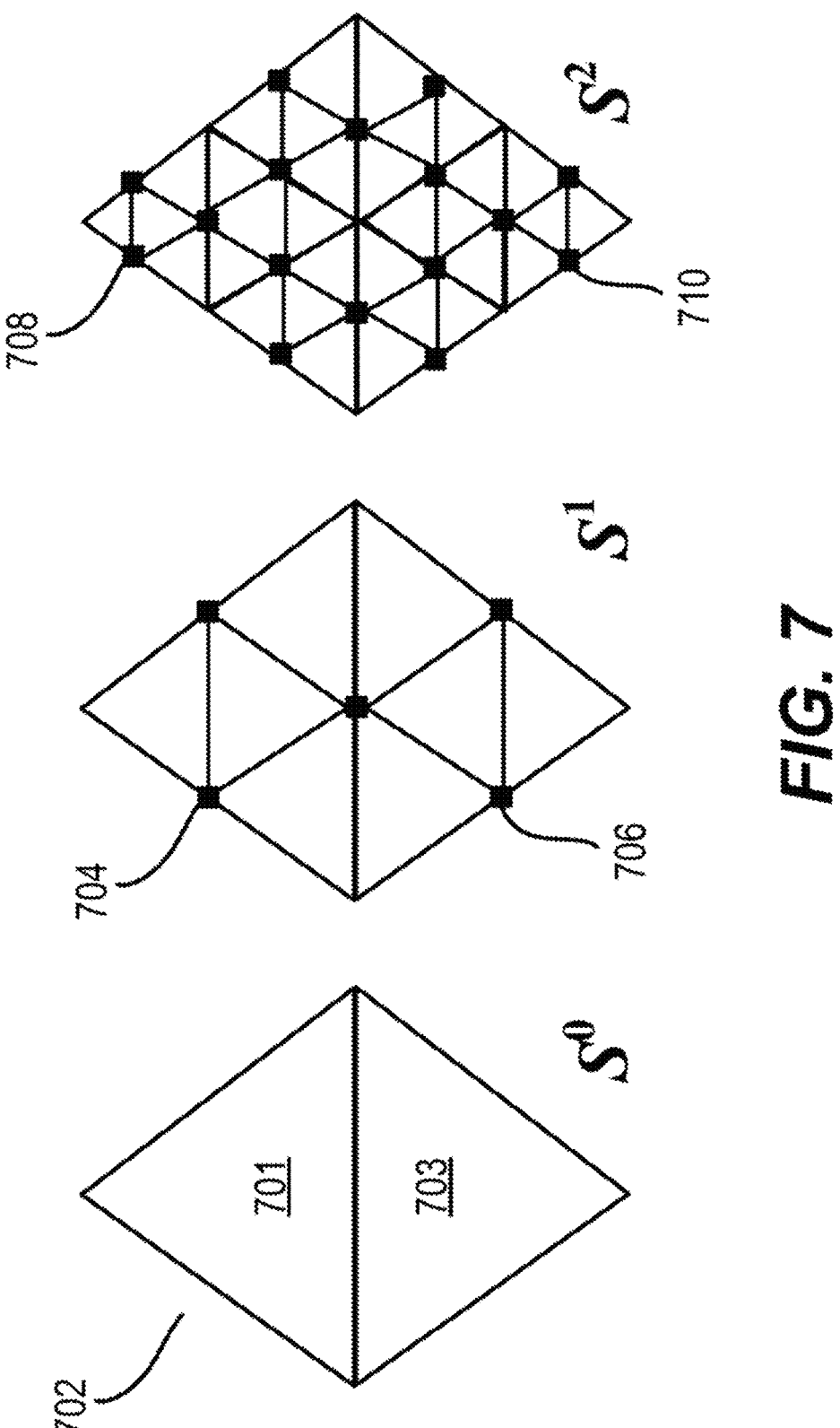
FIG. 7 is a schematic illustration of an example of a subdivision scheme according to an aspect of the disclosure.

In an aspect, pm(i) is subdivided. An example of the subdivision of pm(i) is shown in FIG. 7. As shown in FIG. 7, a re-parameterized mesh pm(i) (702) may be subdivided by applying a subdivision method, such as a mid-point subdivision scheme. The mid-point subdivision scheme may, at each subdivision iteration, subdivide each triangle into 4 sub-triangles as described in FIG. 7. For example, at an initial iteration $S^0$, the re-parameterized mesh pm(i) (702) may include two triangles (701) and (703). At a first iteration $S^1$, a plurality of vertices, such as vertices (704) and (706), may be generated according to the mid-point subdivision scheme. Accordingly, the triangle (701) is subdivided into 4 smaller triangles, and the triangle (703) is also subdivided into 4 smaller triangles. At a second iteration $S^2$, a plurality of vertices, such as vertices (708) and (710), may be generated according to the mid-point subdivision scheme. Accordingly, each triangle formed at the first iteration $S^1$ may be subdivided into 4 triangles at the second iteration $S^2$.

The displacement field d(i) may be computed by determining a nearest point on a surface of the original (or input) mesh M(i) for each vertex of the subdivided mesh.

An encoder may optionally encode a set of displacement vectors associated with the subdivided mesh vertices, referred to as the displacement field d(i). In an example, a reconstructed quantized base mesh m'(i) may be used to update the displacement field d(i) to generate an updated displacement field d'(i). A wavelet transform may then be applied to d'(i) and a set of wavelet coefficients is generated. The wavelet coefficients may then be quantized, packed into a 2D image/video. The quantized and packed wavelet coefficients may be compressed by using an arithmetic coding, a traditional image/video encoder, or any other encoders.

In an aspect, the wavelet transform, such as in MPEG V-DMC 2.0, is a linear lifting transform. The linear lifting transform may include a prediction process and an update process.

In an example, the prediction process is defined in equation (1):

$$\text{Signal}(v) \leftarrow \text{Signal}(v) - \frac{1}{2}(\text{Signal}(v_1) + \text{Signal}(v_2)) \qquad \text{Eq. (1)}$$

where v is a vertex introduced (or positioned) in a middle of an edge $(v_1, v_2)$. Signal(v), $\text{Signal}(v_1)$, and $\text{Signal}(v_2)$ indicate values of geometry/vertex attribute signals at the vertices v, $v_1$, and $v_2$, respectively.

In an example, the update process is defined in equation (2):

$$\text{Signal}(v) \leftarrow \text{Signal}(v) + \frac{1}{8}\sum_{w \in v^*}\text{Signal}(w) \qquad \text{Eq. (2)}$$

where $v^*$ is a set of neighboring vertices of the vertex v.

In the disclosure, methods and systems are provided for an adaptive linear lifting transform for vertex position or displacement vector coding in mesh compression. The methods and systems may be applied individually or by any form of combinations. Further, the methods and systems are not limited to mesh compression. The methods and systems may also be applied to, for example, audio processing, image processing, video processing, or signal processing.

In the disclosure, an adaptive transform, such as an adaptive linear lifting transform, is provided. The adaptive linear lifting transform may include a prediction process and an update process. In an aspect, a weight in the update process is based on distances between a vertex and neighboring vertices of the vertex.

In an aspect, such as at an encoder side, the prediction process of the adaptive linear lifting transform (or forward adaptive linear lifting transform) is defined in equation (3):

$$\text{Signal}(v) \leftarrow \text{Signal}(v) - \frac{1}{2}(\text{Signal}(v_1) + \text{Signal}(v_2)) \qquad \text{Eq. (3)}$$

where v is a vertex in a middle of an edge $(v_1, v_2)$. Signal(v), $\text{Signal}(v_1)$, and $\text{Signal}(v_2)$ indicate values of the vertices v, $v_1$, and $v_2$, respectively. In an example, Signal(v), Signal $(v_1)$, and $\text{Signal}(v_2)$ indicate values of geometry/vertex attribute signals (or geometry/vertex attribute information) at the vertices v, $v_1$, and $v_2$, respectively.

As shown in equation (3), for the prediction process of the adaptive linear lifting transform at the encoder side, an initial prediction value of a current vertex is determined as (i) a value (e.g., an initial value) of the current vertex minus (ii) an average value of a plurality of neighboring vertices. In the example of the equation (3), the plurality of neighboring vertices includes two neighboring vertices $v_1$, and $v_2$.

In an aspect, such as at the encoder side, the update process of the adaptive linear lifting transform is defined in equation (4):

$$\text{Signal}(v) \leftarrow \text{Signal}(v) + c \times \sum_{w \in v^*} \frac{\text{Signal}(w)}{dist(v, w)} \qquad \text{Eq. (4)}$$

where $v^*$ is a set of neighboring vertices of the vertex v, $dist(v,w)$ is a distance function between vertices v and w, and c is a scalar constant. The distance function provides a distance between the vertex v and each vertex w in the set of neighboring vertices $v^*$. Signal(v) and Signal(w) are values of the vertices v and w, such as values of geometry/vertex attribute signals (or geometry/vertex attribute information) at the vertices v and w, respectively.

As shown in equation (4), a ratio for each of the plurality of neighboring vertices (e.g., $v^*$) is determined. The ratio is equal to a value of the respective neighboring vertex (e.g., w) over a distance between a current vertex (e.g., v) and the respective neighboring vertex. A sum of the ratios of the plurality of neighboring vertices is determined. A product of (i) a constant (e.g., c) and (ii) the sum of the ratios of the plurality of neighboring vertices is determined. An update prediction value of the current vertex is determined as a sum of a value (e.g., the initial prediction value obtained in equation (3)) of the current vertex and the product of (i) the constant and (ii) the sum of the ratios of the plurality of neighboring vertices.

In the disclosure, an inverse adaptive transform, such as an inverse adaptive linear lifting transform, is provided. The inverse adaptive linear lifting transform may include an update process and prediction process, where the update process comes before the prediction process.

In an aspect, such as at an decoder side, the update process in the inverse adaptive transform is defined in equation (5):

$$\text{Signal}(v) \leftarrow \text{Signal}(v) - c \times \sum_{w \in v^*} \frac{\text{Signal}(w)}{dist(v, w)} \qquad \text{Eq. (5)}$$

where $v^*$ is a set of neighboring vertices of a vertex v, $dist(v,w)$ is a distance function between vertices v and w, and c is a scalar constant. The distance function provides a distance between the vertex v and each vertex w in the set of neighboring vertices $v^*$.

As shown in equation (5), a ratio for each of a plurality of neighboring vertices (e.g., $v^*$) of a current vertex (e.g., v) is determined. The ratio is equal to a value of the respective neighboring vertex (e.g., w) over a distance between the current vertex (e.g., v) and the respective neighboring vertex (e.g., w). A sum of the ratios of the plurality of neighboring vertices is determined. A product of (i) a constant (e.g., c) and (ii) the sum of the ratios of the plurality of neighboring vertices is determined. An update value of the current vertex is determined as a value of the current vertex minus the product of (i) the constant and (ii) the sum of the ratios of the plurality of neighboring vertices. In an aspect, the value of the current vertex is the updated prediction value that is obtained in equation (4) and signaled to the decoder.

In an aspect, such as the decoder side, the prediction process in the inverse adaptive linear lifting transform is defined in equation (6):

$$\text{Signal}(v) \leftarrow \text{Signal}(v) - \frac{1}{2}(\text{Signal}(v_1) + \text{Signal}(v_2)) \qquad \text{Eq. (6)}$$

where v is a vertex in a middle of an edge $(v_1, v_2)$. Signal(v), Signal($v_1$), and Signal($v_2$) are values of the vertices v, $v_1$, and $v_2$, such as values of geometry/vertex attribute signals (or geometry/vertex attribute information) at the vertices v, $v_1$, and $v_2$, respectively.

As shown in equation (6), for the prediction process of the inverse adaptive linear lifting transform at the decoder side, a prediction value of a current vertex is determined as (i) a value (e.g., the updated value obtained in equation (5)) of the current vertex minus (ii) an average value of a plurality of neighboring vertices. In the example of the equation (6), the plurality of neighboring vertices includes two neighboring vertices.

In an aspect, the distance function shown in equations (4) and (5) is an $l^1$ distance (e.g., one-dimensional distance). In an aspect, the distance function is an $l^2$ distance (e.g., two-dimensional distance). In an aspect, the distance function is an $l^0$ distance, which is equal to 2 (e.g., always equal to 2) for two vertices. In an aspect, the distance function is an $l^p$ distance (e.g., p-dimensional distance), where $p >= 0$.

In an aspect, the update process in the (forward) adaptive linear lifting transform is defined in equation (7):

$$\text{Signal}(v) \leftarrow \text{Signal}(v) + \frac{c}{|v^*|} \times \sum_{w \in v^*} \frac{\text{Signal}(w)}{dist(v, w)} \qquad \text{Eq. (7)}$$

where $v^*$ is a set of neighboring vertices of a vertex v, $dist(v,w)$ is a distance function between vertices v and w, c is a scalar constant, and $|v^*|$ is a cardinal number of $v^*$, such as a total number of vertices in the set $v^*$. Signal(v) and Signal(w) are values of the vertices v and w, such as values of geometry/vertex attribute signals (or geometry/vertex attribute information) at the vertices v and w, respectively.

In an aspect, the update process in the inverse adaptive linear lifting transform is defined in equation (8):

$$\text{Signal}(v) \leftarrow \text{Signal}(v) - \frac{c}{|v^*|} \times \sum_{w \in v^*} \frac{\text{Signal}(w)}{dist(v, w)} \qquad \text{Eq. (8)}$$

where $v^*$ is a set of neighboring vertices of a vertex v, $dist(v,w)$ is a distance function between vertices v and w, c is a scalar constant, and $|v^*|$ is a cardinal number of $v^*$, such as a total number of vertices in the set $v^*$.

In an aspect, the adaptive linear lifting transform is applied to selected (or preselected) mesh frame(s) of a mesh sequence.

In an aspect, the adaptive linear lifting transform is applied to selected (or preselected) region(s) of a mesh frame.

In an aspect, the plurality of vertices is included in a base layer of the mesh frame. In an example, a base layer of the mesh frame is also referred to as a level of detail 0 video, which contains low frequency coefficients. In an example, the base layer is a fundamental layer that stores core geometric information of the mesh. It may include vertices, edges, and faces of the mesh.

In an aspect, the plurality of vertices is included in an enhancement layer of the mesh frame. In an example, the enhancement layer of the mesh frame includes additional information or functionality with respect to the base layer. For example, the enhancement layer may include texture coordinates, normals, and material properties (e.g., roughness, reflectivity, and emissivity).

In an aspect, the adaptive linear lifting transform is applied to selected (or preselected) frequency band(s) of a mesh frame.

Figure 8:
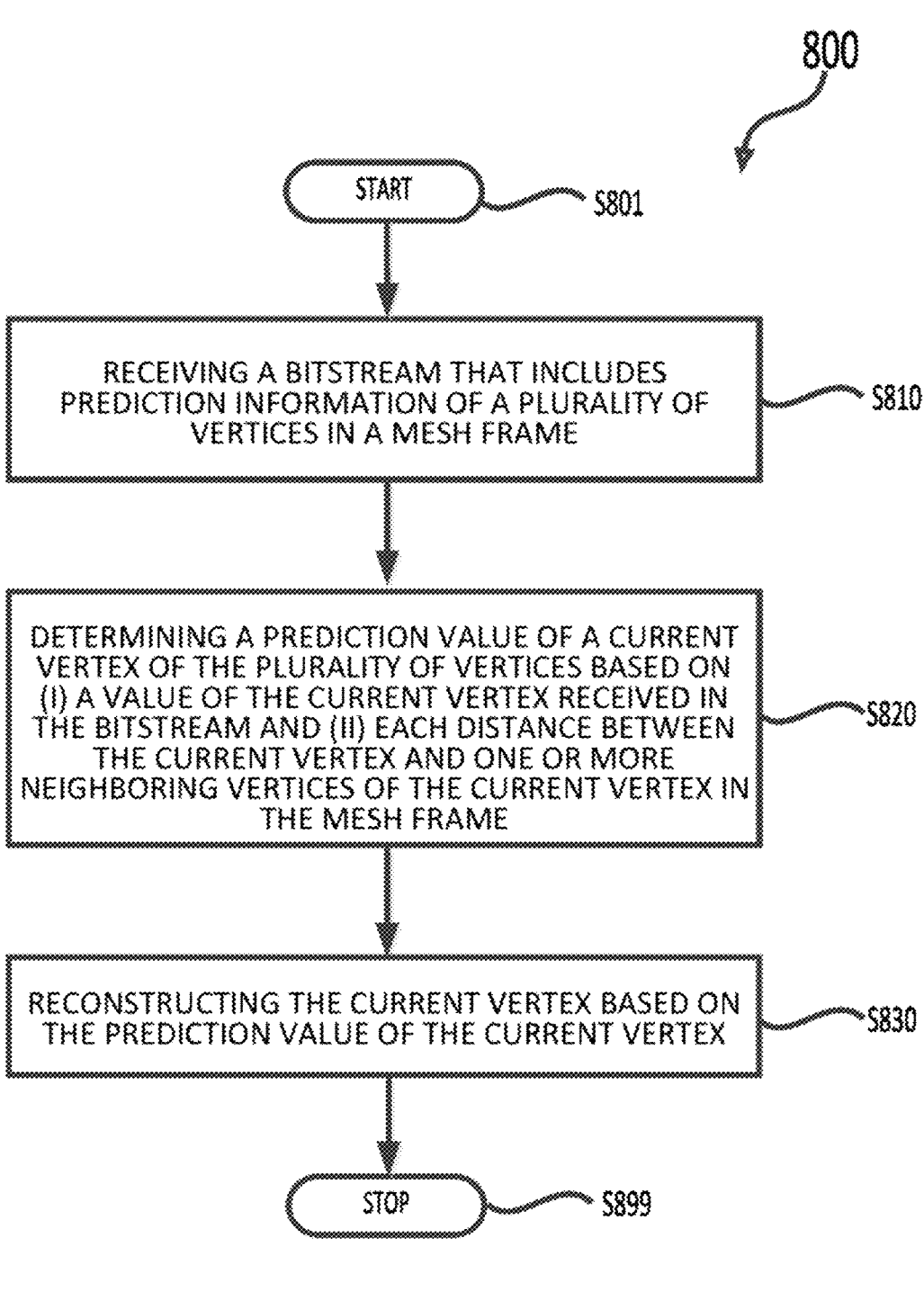
FIG. 8 shows a flow chart outlining a mesh decoding process according to some aspects of the disclosure.

FIG. 8 shows a flow chart outlining a process (800) according to an aspect of the disclosure. The process (800) can be used in a video decoder. In various aspects, the process (800) is executed by processing circuitry, such as the processing circuitry that performs functions of the video decoder (110), the processing circuitry that performs functions of the video decoder (210), and the like. In some aspects, the process (800) is implemented in software instructions, thus when the processing circuitry executes the software instructions, the processing circuitry performs the process (800). The process starts at (S801) and proceeds to (S810).

At (S810), a bitstream that includes prediction information of a plurality of vertices in a mesh frame is received.

At (S820), a prediction value of a current vertex of the plurality of vertices is determined based on (i) a value of the current vertex received in the bitstream and (ii) each distance between the current vertex and one or more neighboring vertices of the current vertex in the mesh frame.

At (S830), the current vertex is reconstructed based on the prediction value of the current vertex.

In an aspect, the one or more neighboring vertices of the current vertex include a plurality of neighboring vertices. An updated value of the current vertex is determined. The prediction value of the current vertex is determined as a sum of (i) the updated value of the current vertex and (ii) an average value of the plurality of neighboring vertices.

In an aspect, a ratio for each of the plurality of neighboring vertices is determined. The ratio is equal to a value of the respective neighboring vertex over a distance between the current vertex and the respective neighboring vertex. A sum of the ratios of the plurality of neighboring vertices is determined. A product of (i) a constant and (ii) the sum of the ratios of the plurality of neighboring vertices is determined. The update value of the current vertex is determined as the value of the current vertex minus the product of (i) the constant and (ii) the sum of the ratios of the plurality of neighboring vertices.

In an aspect, the constant is equal to a scalar constant over a total number of the plurality of neighboring vertices.

In an aspect, the mesh frame is a selected mesh frame in a mesh sequence.

In an aspect, the plurality of vertices is included in a selected region of the mesh frame.

In an aspect, the plurality of vertices is included in a base layer of the mesh frame.

In an aspect, the plurality of vertices is included in an enhancement layer of the mesh frame.

In an aspect, the plurality of vertices is included in a selected frequency band of the mesh frame.

Then, the process proceeds to (S899) and terminates.

The process (800) can be suitably adapted. Step(s) in the process (800) can be modified and/or omitted. Additional step(s) can be added. Any suitable order of implementation can be used.

FIG. 9 shows a flow chart outlining a process (900) according to an aspect of the disclosure. The process (900) can be used in a video encoder. In various aspects, the process (900) is executed by processing circuitry, such as the processing circuitry that performs functions of the video encoder (103), the processing circuitry that performs functions of the video encoder (303), and the like. In some aspects, the process (900) is implemented in software instructions, thus when the processing circuitry executes the software instructions, the processing circuitry performs the process (900). The process starts at (S901) and proceeds to (S910).

At (S910), an initial prediction value of a current vertex of a plurality of vertices in a mesh frame is determined based on (i) a value of the current vertex and (ii) each value of one or more neighboring vertices of the current vertex in the mesh frame.

At (S920), an updated prediction value of the current vertex is determined based on (i) the initial prediction value of the current vertex and (ii) each distance between the current vertex and the one or more neighboring vertices of the current vertex in the mesh frame.

At (S930), the current vertex is encoded based on the updated prediction value of the current vertex into a bitstream.

In an aspect, the one or more neighboring vertices of the current vertex include a plurality of neighboring vertices. The initial prediction value of the current vertex is determined as (i) the value of the current vertex minus (ii) an average value of the plurality of neighboring vertices.

In an aspect, a ratio for each of the plurality of neighboring vertices is determined. The ratio is equal to a value of the respective neighboring vertex over a distance between the current vertex and the respective neighboring vertex. A sum of the ratios of the plurality of neighboring vertices is determined. A product of (i) a constant and (ii) the sum of the ratios of the plurality of neighboring vertices is determined. The update prediction value of the current vertex is determined as a sum of the initial prediction value of the current vertex and the product of (i) the constant and (ii) the sum of the ratios of the plurality of neighboring vertices.

Then, the process proceeds to (S999) and terminates.

The process (900) can be suitably adapted. Step(s) in the process (900) can be modified and/or omitted. Additional step(s) can be added. Any suitable order of implementation can be used.

In an aspect, a method of processing mesh data includes processing a bitstream of the mesh data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, a bitstream of the mesh data is processed according to a format rule. The bitstream includes prediction information of a plurality of vertices in a mesh frame. The format rule specifies that a prediction value of a current vertex of the plurality of vertices is determined based on (i) a value of the current vertex received in the bitstream and (ii) each distance between the current vertex and one or more neighboring vertices of the current vertex in the mesh frame.

The format rule specifies that the current vertex is processed based on the prediction value of the current vertex.

The techniques described above, can be implemented as computer software using computer-readable instructions and physically stored in one or more computer-readable media. For example, FIG. 10 shows a computer system (1000) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
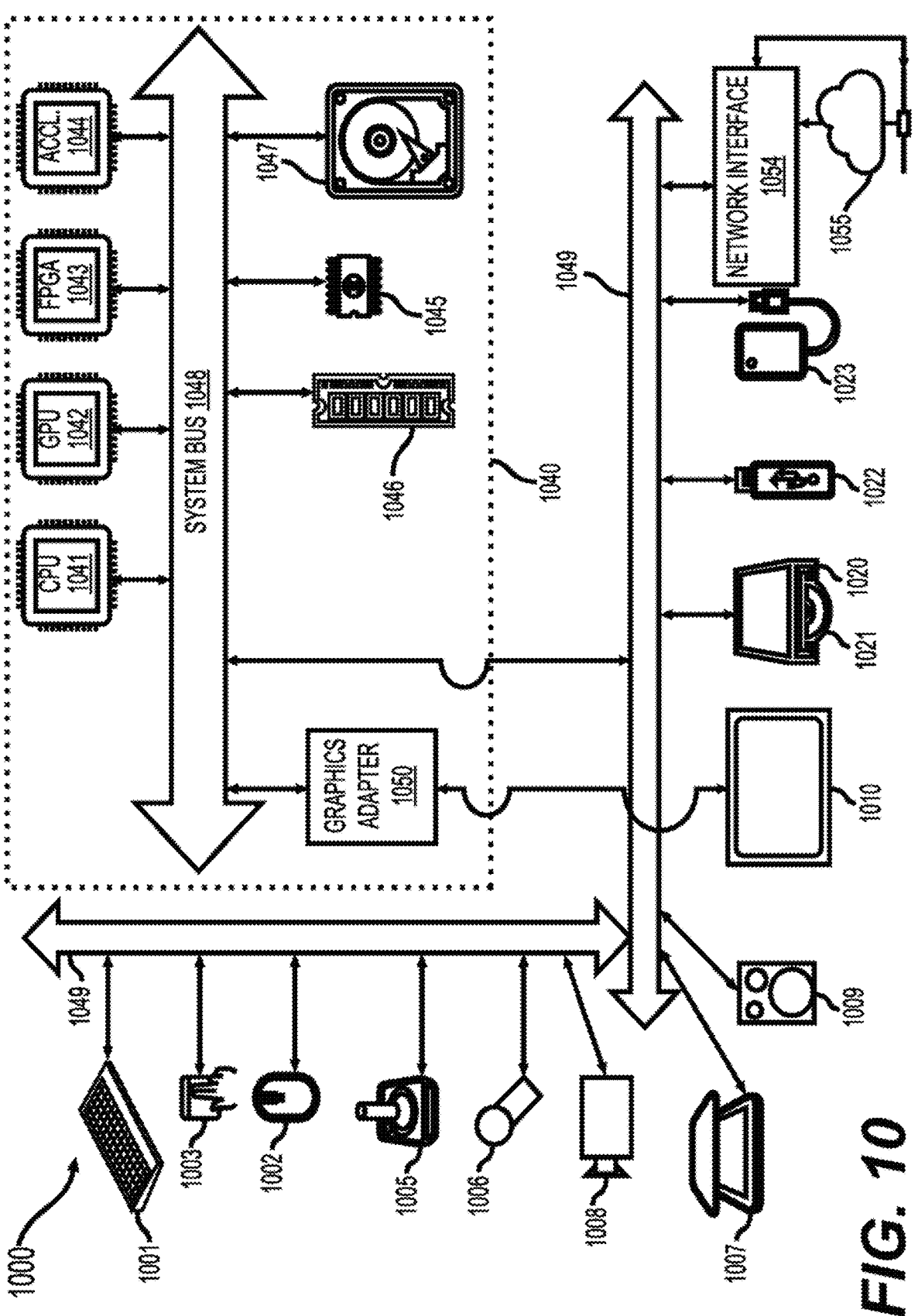
FIG. 10 is a schematic illustration of a computer system in accordance with an aspect of the disclosure.

The components shown in FIG. 10 for computer system (1000) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various aspects of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hard-wired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh decoding, comprising:
receiving a bitstream that includes prediction information of a plurality of vertices in a mesh frame;
determining a prediction value of a current vertex of the plurality of vertices based on (i) a value of the current vertex received in the bitstream and (ii) a sum of ratios associated with a plurality of neighboring vertices of the current vertex, each of the ratios being equal to a value of a respective neighboring vertex of the plurality of neighboring vertices over a distance between the respective neighboring vertex and the current vertex; and
reconstructing the current vertex based on the prediction value of the current vertex.

2. The method of claim 1, wherein
the determining the prediction value of the current vertex further comprises:
determining an updated value of the current vertex, and determining the prediction value of the current vertex as a sum of (i) the updated value of the current vertex and (ii) an average value of the plurality of neighboring vertices.

3. The method of claim 2, wherein the determining the updated value of the current vertex comprises:
determining the ratios associated with the plurality of neighboring vertices;
determining the sum of the ratios of the plurality of neighboring vertices;
determining a product of (i) a constant and (ii) the sum of the ratios of the plurality of neighboring vertices; and
determining the updated value of the current vertex as the value of the current vertex minus the product of (i) constant and (ii) the sum of the ratios of the plurality of neighboring vertices.

4. The method of claim 3, wherein the constant is equal to a scalar constant over a total number of the plurality of neighboring vertices.

5. The method of claim 1, wherein the mesh frame is a selected mesh frame in a mesh sequence.

6. The method of claim 1, wherein the plurality of vertices is included in a selected region of the mesh frame.

7. The method of claim 1, wherein the plurality of vertices is included in a base layer of the mesh frame.

8. The method of claim 1, wherein the plurality of vertices is included in an enhancement layer of the mesh frame.

9. The method of claim 1, wherein the plurality of vertices is included in a selected frequency band of the mesh frame.

10. A method of mesh encoding, comprising:
determining an initial prediction value of a current vertex of a plurality of vertices in a mesh frame based on (i) a value of the current vertex and (ii) each value of a plurality of neighboring vertices of the current vertex in the mesh frame;
determining an updated prediction value of the current vertex based on (i) the initial prediction value of the current vertex and (ii) a sum of ratios associated with the plurality of neighboring vertices of the current vertex, each of the ratios being equal to a value of a respective neighboring vertex of the plurality of neighboring vertices over a distance between the respective neighboring vertex and the current vertex; and
encoding the current vertex based on the updated prediction value of the current vertex into a bitstream.

11. The method of claim 10, wherein
the determining the initial prediction value of the current vertex further comprises:
determining the initial prediction value of the current vertex as (i) the value of the current vertex minus (ii) an average value of the plurality of neighboring vertices.

12. The method of claim 11, wherein the determining the updated prediction value of the current vertex comprises:
determining the ratios associated with the plurality of neighboring vertices;

determining the sum of the ratios of the plurality of neighboring vertices;

determining a product of (i) a constant and (ii) the sum of the ratios of the plurality of neighboring vertices; and determining the updated prediction value of the current vertex as a sum of the initial prediction value of the current vertex and the product of (i) the constant and (ii) the sum of the ratios of the plurality of neighboring vertices.

13. The method of claim 12, wherein the constant is equal to a scalar constant over a total number of the plurality of neighboring vertices.

14. The method of claim 10, wherein the mesh frame is a selected mesh frame in a mesh sequence.

15. The method of claim 10, wherein the plurality of vertices is included in a selected region of the mesh frame.

16. The method of claim 10, wherein the plurality of vertices is included in a base layer of the mesh frame.

17. The method of claim 10, wherein the plurality of vertices is included in an enhancement layer of the mesh frame.

18. The method of claim 10, wherein the plurality of vertices is included in a selected frequency band of the mesh frame.

19. A non-transitory computer-readable storage medium storing instructions which, when executed by a processor, cause the processor to perform a method of encoding a bitstream comprising:

determining an initial prediction value of a current vertex of a plurality of vertices in a mesh frame based on (i) a value of the current vertex and (ii) each value of a plurality of neighboring vertices of the current vertex in the mesh frame;

determining an updated prediction value of the current vertex based on (i) the initial prediction value of the current vertex and (ii) a sum of ratios associated with the plurality of neighboring vertices of the current vertex, each of the ratios being equal to a value of a respective neighboring vertex of the plurality of neighboring vertices over a distance between the respective neighboring vertex and the current vertex;

encoding the current vertex based on the updated prediction value of the current vertex into the bitstream; and transmitting the encoded bitstream.

20. The non-transitory computer-readable storage medium of claim 19, wherein the determining the initial prediction value of the current vertex further comprises:

determining the initial prediction value of the current vertex as (i) the value of the current vertex minus (ii) an average value of the plurality of neighboring vertices.

* * * * *